(12) United States Patent
Green

(10) Patent No.: US 8,085,191 B2
(45) Date of Patent: Dec. 27, 2011

(54) POSITION DETERMINATION BASED ON CORROBORATED SIGNAL PROCESSING OF PRN CODES

(75) Inventor: James C. Green, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 457 days.

(21) Appl. No.: 12/193,142

(22) Filed: Aug. 18, 2008

(65) Prior Publication Data

US 2010/0315285 A1 Dec. 16, 2010

(51) Int. Cl.
*G01S 19/48* (2010.01)
(52) U.S. Cl. .................................. 342/357.31
(58) Field of Classification Search ............ 342/357.31
See application file for complete search history.

(56) References Cited

U.S. PATENT DOCUMENTS

| | | | |
|---|---|---|---|
| 5,323,163 A * | 6/1994 | Maki | 342/357.48 |
| 5,786,773 A | 7/1998 | Murphy | |
| 5,884,214 A * | 3/1999 | Krasner | 701/207 |
| 6,430,416 B1 | 8/2002 | Loomis | |
| 6,728,637 B2 * | 4/2004 | Ford et al. | 701/213 |
| 6,810,324 B1 | 10/2004 | Nadkarni | |
| 6,957,143 B1 | 10/2005 | Nadkarni | |
| 7,298,326 B2 * | 11/2007 | Duong et al. | 342/374 |
| 7,436,354 B2 * | 10/2008 | Lee | 342/357.29 |
| 7,479,922 B2 * | 1/2009 | Hunt et al. | 342/357.31 |
| 7,595,754 B2 * | 9/2009 | Mehta | 342/450 |
| 7,633,436 B2 * | 12/2009 | Kangas | 342/357.43 |
| 7,702,460 B2 | 4/2010 | Liu et al. | |

\* cited by examiner

*Primary Examiner* — Thomas Tarcza
*Assistant Examiner* — Cassie Galt

(57) ABSTRACT

Embodiments provided herein recite methods and systems for corroborating position system code from Navigation Satellite System (NSS) signals. In one embodiment, a NSS high yield module attempts to determine a high yield location solution based on a first set of PRN codes. In addition, a NSS high accuracy module attempts to determine a high accuracy location solution based on signal processing of the same first set of PRN codes. A location solution corroborator module receives input from both the NSS high yield module and the NSS high accuracy module and generates a corroborated location solution. In one embodiment, a position provider outputs the corroborated location solution.

24 Claims, 6 Drawing Sheets

POSITION DETERMINATION BASED ON CORROBORATED SIGNAL PROCESSING OF PRN CODES

TECHNICAL FIELD

Embodiments in accordance with the present invention generally pertain to navigation devices.

BACKGROUND

A Navigation satellite system (NSS) is a space based radio positioning network for providing users equipped with suitable receivers highly accurate position, velocity, and time (PVT) information. One of the most recognizable NSS systems is the global positioning system (GPS) developed by the United States of America, although there are numerous other systems including local NSS's that utilize fewer satellites in a geosynchronous orbit. Thus, although the following background describes the operation of the GPS system in particular, it is appreciated that the description is meant to provide a generic overview of NSS operations as opposed to specific reliance on a single NSS.

In general, the space based portion of GPS comprises a constellation of GPS satellites in non-geosynchronous 12-hour orbits around the earth. GPS satellites are located in six orbital planes with four of the GPS satellites in each plane, plus a number of "on orbit" spare satellites for redundancy. The orbital planes of the GPS satellites have an inclination of 55 degrees relative to the equator and an altitude of approximately 20,200 km (10,900 miles) and typically complete an orbit in approximately 12 hours. The positions of GPS satellites are such that a minimum of five of the total constellation of GPS satellites are normally observable (above the horizon) by a user anywhere on earth at any given time.

NSS position determination is based upon a concept referred to as time of flight (TOF) ranging. For example, each of the orbiting GPS satellites broadcasts spread spectrum microwave signals encoded with positioning data and satellite ephemeris information. Essentially, the signals are broadcast at precisely known times and at precisely known intervals. The signals are encoded with their precise time of transmission.

The signal is received at a NSS receiver designed to determine the time of flight from satellite to receiver by synchronizing a local replica of the satellite signal and determining the time of flight of this signal, compare it to the time of transmission, and to demodulate the satellite orbital data contained in the Satellite Data Message. The coded satellite signal contains information describing when the signal was sent from the satellite. The NSS receiver determines the time between transmission of the signal by the satellite and reception by the receiver. Multiplying this by the speed of light gives what is termed the pseudorange measurement of that satellite. It is called a pseudorange because of the many kinds of errors that occur due to clock errors, propagation errors, multipath errors, and the like.

If the NSS receiver clock were perfect, this would be the range measurement for that satellite, but the imperfection of the clock causes it to differ by the time offset between actual time and receiver time. Thus, the measurement is called a pseudorange, rather than a range. However, the time offset is common to the pseudorange measurements of all the satellites. By determining the pseudoranges of four or more satellites, the NSS receiver is able to determine its location in three dimensions, as well the time offset. In addition, because the signal is consistently generated and broadcast, the NSS receiver is able to determine position, velocity, and time (PVT) information on an ongoing basis thereby allowing navigation from point to point.

SUMMARY OF THE INVENTION

Embodiments provided herein recite methods and systems for corroborating position system codes from Navigation Satellite System (NSS) signals. In one embodiment, a NSS high yield module attempts to determine a high yield location solution based on a first set of PRN codes. In addition, a NSS high accuracy module attempts to determine a high accuracy location solution based on signal processing of the same first set of PRN codes. A location solution corroborator module receives input from both the NSS high yield module and the NSS high accuracy module and generates a corroborated location solution. In one embodiment, a position provider outputs the corroborated location solution.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF EMBODIMENTS

Figure 1:
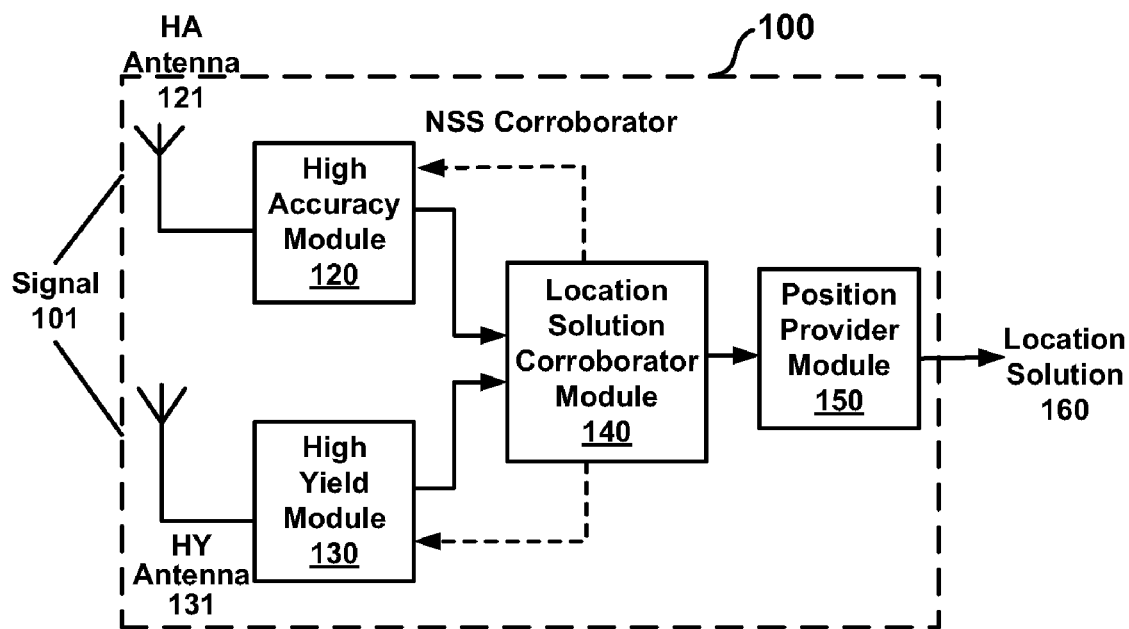
FIG. 1 is a block diagram of a dual antenna NSS corroborator in accordance with an embodiment of the present invention.

Reference will now be made in detail to embodiments of the invention. While the invention will be described in conjunction with the different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the embodiments in accordance with the present invention, numerous specific details are set forth in order to provide a thorough understanding of the embodiments of the present invention. However, the embodiments in accordance with the present invention may be practiced without these specific details. In other instances, well-known methods, procedures, components, and circuits have not been described in detail so as not to unnecessarily obscure aspects of the embodiments in accordance with the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the embodiments in accordance with the present invention, discussions utilizing terms such as "receiving" or "processing" or "decrypting" or "encrypting" or "decoding" or "encoding" or "acquiring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments of the invention relate to GPS Receiver Patents Showing General Functionality as described in detail in U.S. Pat. No. 4,847,862 issued Jul. 11, 1989 and which is assigned to the assignee of the present application, and in U.S. Pat. No. 5,486,834 issued Jan. 23, 1996 which is assigned to the assignee of the present application, and in U.S. Pat. No. 5,621,416 issued Apr. 15, 1997 which is assigned to the assignee of the present application and which is incorporated by reference for all purposes.

Overview

As described herein, navigation satellite system (NSS) refers to a position determining system that utilizes satellite-based position determining components or possibly a variety of terrestrial-based and satellite-based position determining components to determine a geographic position. In one embodiment, the geographic position provided by the NSS describes the latitude and longitude at the receiving device's location. However, NSS's may also be used to determine elevation, speed, time, and the like. In some cases, the navigation satellite systems are global (e.g., GNSS), however, there are also NSS's that are local (e.g., LNSS). In other words, while NSS's such as global positioning system (GPS) provide global navigation, there are also numerous other satellite systems, that provide only local or fixed location signals. The present technology is well suited for use in GNSS environments, LNSS environments or a combination thereof.

In different embodiments, NSS receivers operate by receiving portions of code provided by the group of local and global NSS signal providers including, but not limited to, a GPS signal, a Galileo signal, a Globalnaya Navigatsionnay Sputnikovaya Sistema (GLONASS) signal, the Indian Regional Navigational Satellite System (IRNSS), and a Compass signal; corrections signals may also be received from a variety of corrections systems, including the Wide Area Augmentation System (WAAS), the European Geostationary Navigation Overlay Service (EGNOS), the MTSAT Satellite-based Augmentation System signal, the GAGAN System of India, the OmniSTAR® system, and the Quasi-zenith Satellite System (QZSS) of Japan.

For purposes of the present discussion, navigation satellite system (NSS) receivers are broken into two basic categories, standard or high yield (HY) receivers and precise or high accuracy (HA) receivers. Generally, a HY receiver (or HY module) refers to an NSS receiver configured to achieve a less accurate position solution and often at a much higher rate of delivery than an HA receiver. In contrast, an HA receiver (or HA module) refers to a receiver configured to provide a position solution within a defined level of accuracy such as not tracking a signal below a pre-defined signal-to-noise ratio. In other words, there is a tradeoff between yield and accuracy. A HY receiver is normally designed and configured to give up accuracy to obtain high yield, and a HA receiver is designed and configured to give up yield to obtain high accuracy. For a variety of reasons, HY receivers are generally less expensive to produce than HA receivers.

In general, HY receivers are usually optimized to track all signals, even those of poor quality and low signal strength. In contrast, HA receivers are optimized to make high quality measurements only and generally do not track low quality weak signals as they are inherently unable to generate high accuracy results. In many cases, the requirements for tracking signals with the highest accuracy often result in more expensive circuitry resulting in more expensive solutions.

Therefore, there are times when the HY receiver will be able to achieve a location solution when the HA receiver cannot. For example, based on accuracy requirements and filtering, the HA receiver may not be able to arrive at a location solution. However, by corroborating any data from the HY receiver with that of the HA receiver, a number of possible advantages may be realized. For example, by corroborating the data, the HA receiver may be able to obtain a HA location solution, or errors may be recognized and therefore acted upon, or signals from additional satellites may be processed, or inconsistencies may be recognized, or the like.

The present technology allows a user to operate a significantly more expensive HA receiver at a previously unattainable level or in a previously unavailable location. In addition, embodiments described herein significantly increase user satisfaction and NSS device operation characteristics as well as the overall NSS device envelope of operation without deleteriously effecting product manufacturing costs or overall NSS device accuracy. One example of a GPS chipset upon which embodiments of the present technology may be implemented is the Maxwell VI™ chipset which is commercially available from Trimble® Navigation of Sunnyvale, Calif., 94085. Other examples of a GPS chipsets upon which embodiments of the present technology may be implemented are the SiRFstar III™ GSC3e/LP and GSC3f/LP chipsets which are commercially available from SiRF® Technology Inc., of San Jose, Calif., 95112.

While the present embodiment specifically recites a NSS position determining system, embodiments of the present invention are well suited to utilize a variety of terrestrial-based and satellite-based position determining components as well. In embodiments of the present invention, the geographic position determined by position determining component 120 describes the latitude and longitude of electronic device 100. However, position determining component 120 may also determine the elevation of electronic device in embodiments of the present invention.

With reference now to FIG. 1, a block diagram of a NSS corroborator 110 having a separate antennae (e.g., HA antenna 121 and HY antenna 131) configuration for HY and HA acquisition is shown in accordance with one embodiment of the present invention. In one embodiment, system 110 includes an HA module 120 for processing positioning signal 101 and a HY module 130 for processing the same positioning signal 101. In one embodiment, each of the HA module 120 and the HY module 130 may have their own radio frequency (RF) down converters, digital signal processing (DSP) engines, and communications protocols and devices (e.g., ports, timing, and the like). However, in another embodiment, the HA module 120 and the HY module 130 may share any, a combination of or all NSS components such as the radio frequency (RF) down converter, the digital signal processing (DSP) engine, the communications protocols and devices (e.g., ports, timing, and the like), and the like.

In addition, NSS corroborator 110 includes a location solution corroborator module 140 and a position provider module 150. In one embodiment, the location solution corroborator module 140 receives data from both HA module 120 and HY module 130. As described in detail herein, the data received at location solution corroborator module 140 may be complete position data, partial position data, complete positioning solutions, partial positioning solutions, recognized errors, correction information, timing information and the like. For example, while HA module 120 may not be able to provide a complete location solution 160, any amount of data generated by HA module 120 will be provided to location solution corroborator module 140. In the same fashion, while HY module 130 may not be able to provide a complete location solution 160, any amount of data generated by HY module 130 will be provided to location solution corroborator module 140.

In operation, the present technology of both the HA and the HY receivers will output location solution data as part of a relevant serial protocol. For example, receiver designs using a chipset such as the Maxwell VI™ or the SirfStarIII™ chipset previously discussed herein may be used to perform this protocol. In one embodiment, the output location solution data are output as part of the relevant serial protocols. For example, the serial protocols may be Trimble Standard Interface Protocol (TSIP) of Trimble®Navigation of Sunnyvale, Calif., 94085, National Marine Electronics Association (NMEA) protocols such as NMEA-0180, NMEA-0182 and NMEA-0183 or other well known GNSS serial protocols.

Position provider module 150 is utilized to output a location solution 160.

Figure 2:
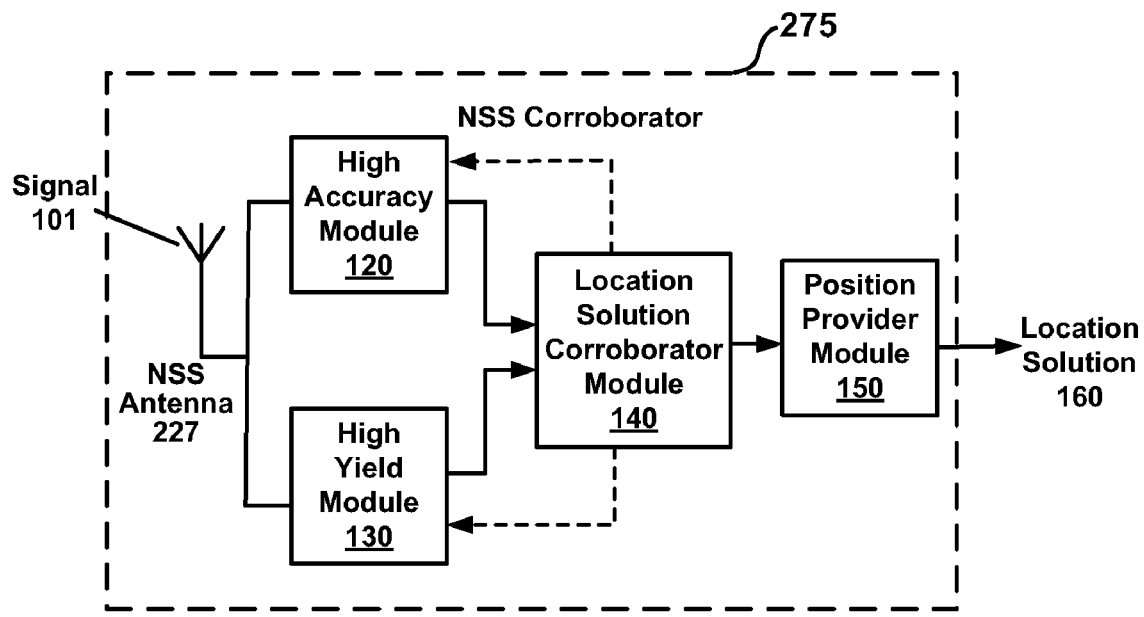
FIG. 2 is a block diagram of a single antenna NSS corroborator in accordance with an embodiment of the present invention.

With reference now to FIG. 2, a block diagram of a NSS corroborator 275 having a single NSS antennae 227 configuration for HY and HA acquisition is shown in accordance with one embodiment of the present invention. System 275 includes an HA module 120 for processing positioning signal 101 and a HY module 130 for processing the same position signal 101 in a fashion similar to that described in FIG. 1. Further, as described with respect to NSS corroborator 110, the HA module 120 and the HY module 130 of NSS corroborator 275 may also share any or all NSS components such as, radio frequency (RF) down converter, digital signal processing (DSP) engine, communications protocols and devices (e.g., ports, timing, and the like) in addition to sharing the NSS antenna 227.

In general, antennas 121, 227 and 131 may be any type of antenna capable of receiving an NSS signal at the frequencies such signals are transmitted. All GNSS satellites transmit a Right Hand Circular Polarized (RHCP) signal.

Figure 3:
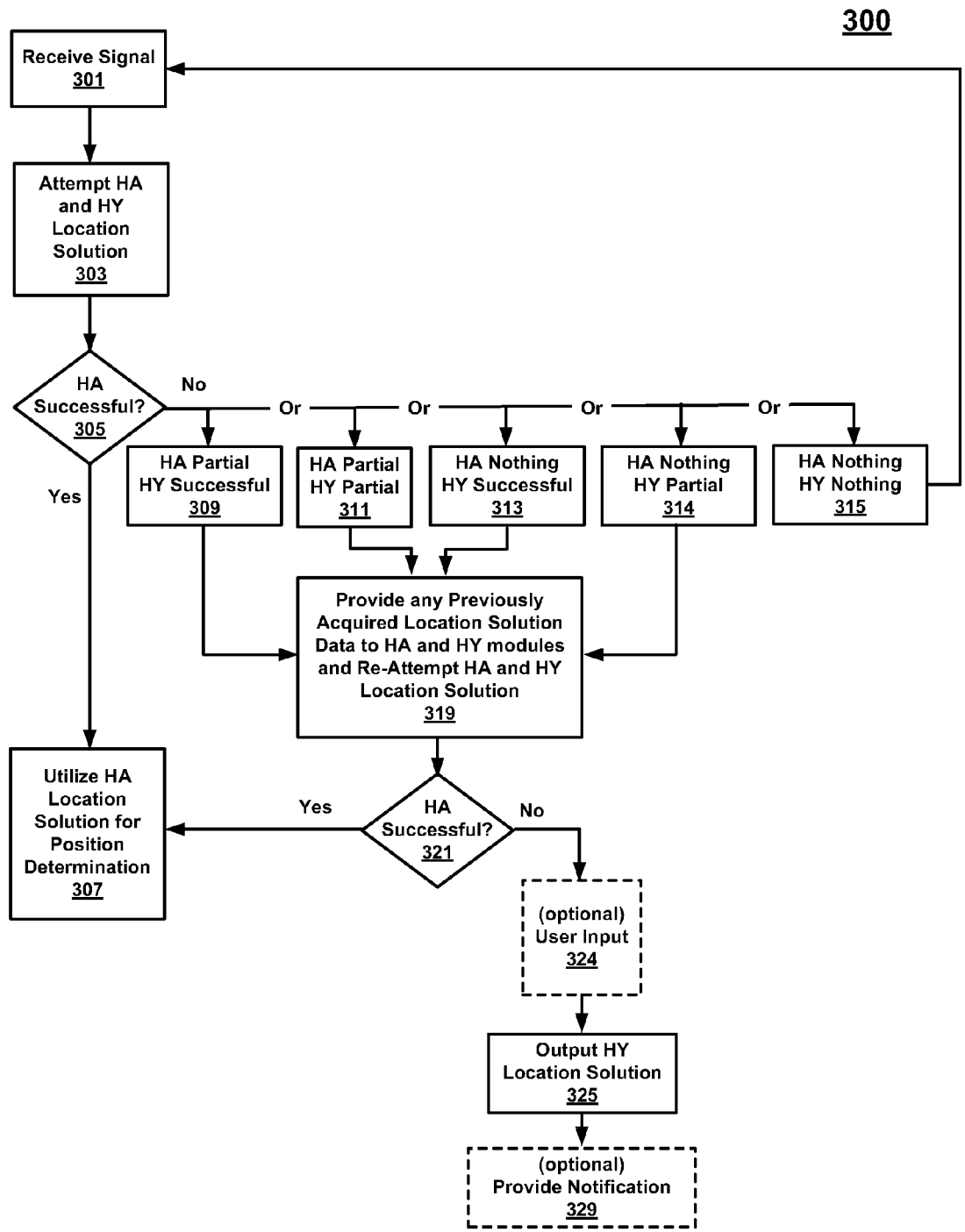
FIG. 3 is a flowchart of a method for HY and HA corroboration in accordance with an embodiment of the present invention.

Referring now to FIG. 3 and also to FIG. 1, a flowchart 300 of a method for HY and HA corroboration is shown in accordance with one embodiment of the present invention. In general, embodiments of the present invention allow a user to utilize advanced aspects of a high accuracy receiver with a normally unavailable lower accuracy location solution 160. In one embodiment, the minimum level of accuracy of the location solution 160 is user definable. In another embodiment, a notification may be provided whenever the NSS corroborator system 110 is operating below a pre-defined level of accuracy.

Specifically, advanced NSS capabilities such as land survey, aviation, location, interactive maps, two-antenna blade control systems for machine control, differential capable systems that utilize any of several sources of differential corrections such as Coast Guard system or the Wide Area Augmentation System (WAAS), or the like are presently available to HA module 120. However, in some cases the PRN code accessible to an HA module 120 may be insufficient for the HA module 120 to obtain a location solution 160. However, by integrating the HA module 120 with corroborating data from the HY module 130, additional information about the PRN code (e.g., signal 101) may be derived or extrapolated.

With reference now to 301 of FIG. 3, a signal is received. In one embodiment, the NSS signal 101 may be received from local and global NSS signals such as, but not limited to, GPS, Galileo, GLONASS, Compass, and the like.

Moreover, in one embodiment, the satellite navigation signal 101 being received may be, but is not meant to be limited to, L1 signal, E1 signal, E2 signal, L2 signal, L3 signal, E6 signal, B3 signal, LEX signal, L5 signal, and an E5 signal. Furthermore, although signal 101 may be from a satellite based device, the signal may be a signal generated by a device placed in line of sight. For example, if an area has low or weak satellite coverage, an Earth based signal generator often referred to as a pseudolite transmitter, may be utilized to distribute the previously described signal 101. The Earth based signal generator may be a land or sea type device and may be portable or stationary.

With reference now to 303 of FIG. 3 and still to FIG. 1, in one embodiment HA and HY acquisition is attempted. That is, both the HA module 120 and the HY module 130 attempt to acquire the positioning signal. The attempt to acquire may be from a cold start (e.g., no initialization), a warm start (e.g., approx. 50% initialization), or a hot start (e.g., approximately 95% initialization). In one embodiment, the acquisition of the receivers refers to acquiring and tracking the code and carrier phase, and demodulating the satellite data message from a PRN code. In another embodiment, the HA and HY acquisition refers to a location solution 160. In one embodiment, the location solution 160 includes position, velocity, and/or time (PVT) data.

In general, the starting temperature (e.g., cold, warm, or hot) may be functions of how recently HA module 120 and/or HY module 130 has been used. For example, if the last use was in the same general area and utilized the same visual cues (e.g., satellites) as the present use, then the acquisition time may be much faster than for a HA module 120 and/or HY module 130 that has not been utilized in the same area or within the same time frame.

After an amount of time has passed since receiving the signal 101, HA module 120 and/or HY module 130 may or may not have successfully generated location solution data. A number of possible outcomes are addressed herein; however, it is appreciated that the total number of probable combinations may be different than those shown. For purposes of clarity, only a few of the numerous combinations are provided, however, it is understood that the present technology is well suited to deal with any combination utilizing the framework described herein.

Referring now to 305 of FIG. 3 and to FIG. 1, in one embodiment if HA module 120 has successfully generated a high accuracy location solution, location solution corroborator module 140 passes the high accuracy location solution directly to position provider module 150 and a high accuracy location solution 160 is output. In so doing, NSS corroborator 110 will be operating within the designed accuracy parameters of the HA module 120. However, in another embodiment, even when HA module 120 has successfully generated a location solution, location solution corroborator module 140 may intermittently share any data from HA module 120 with any data received from HY module 130 and vice-versa (further described at 319).

At the other extreme, with reference now to 315 of FIG. 3 and to FIG. 1, in one embodiment if neither the HY module 130 nor the HA module 120 had any success generating a location solution 160, then the system returns to 301. That is, both modules continue trying to receive signal 101 and establish any or all of a location solution. This may go on in infinitum, for a pre-designated period of time or until the receivers are turned off. In another embodiment, a user may be able to interrupt the loop and put in spatial information in order to aid the HY and HA modules. For example, if a map is available, the user may put in latitude/longitude values, grid coordinates, or the like, to help the HA and/or HY modules locate themselves. In another embodiment, a third device may be found which can supply the necessary data to the HY or HA modules in order to help the HY or HA modules receive a signal 301 or achieve a location solution.

With reference now to 309 of FIG. 3 and to FIG. 1, in one embodiment HA module 120 was partially successful at generating a high accuracy location solution and the HY module 130 was successful at generating a high yield location solution.

Referring now to 311 of FIG. 3 and to FIG. 1, in one embodiment the HA module 120 was partially successful at generating a high accuracy location solution and the HY module 130 was partially successful at generating a high yield location solution.

With reference now to 313 of FIG. 3 and to FIG. 1, in one embodiment the HA module 120 was unsuccessful at generating a high accuracy location solution and the HY module 130 was successful at generating a high yield location solution. In another embodiment, as shown at 314 of FIG. 3, the HA module 120 is unsuccessful at generating a high accuracy location solution and the HY module was partially successful at generating a high yield location solution.

Referring now to 319 of FIG. 3 and to FIG. 1, in one embodiment, any acquired location solution data generated by HA module 120 and/or HY module 130 is received at location solution corroborator module 140 and provided back to one or both of HA module 120 and HY module 130. Using this data, HA module 120 and/or HY module 130 re-attempt a location solution. In addition, the raw data received from the HY module 130 and HA module 120 may be compared to ensure that both receivers are receiving the same information. Moreover, as the HY module 130 may more quickly "see" more NSS devices, the HY module 130 may provide location information that may then be passed to HA module 120 to decrease the initial signal acquire time for HA module 120.

Furthermore, HA/HY corroboration at 319 may be used to detect, generate, validate, invalidate or distribute different metrics such as, but not limited to, correction vectors, dilution of precisions (DOP)s, WAAS positioning corrections, accuracy estimates, ionosphere parameters, reference clock adjustments, signal polarization, satellite elevation angles, sampling rate adjustments, signal-to-noise ratio adjustments, and the like. In one embodiment, the corroboration provides identification and removal of inaccuracies or errors with respect to any portion of signal 101 to increase overall corroborator 110 accuracy. In another embodiment, the corroboration provides metric adjustments that can be utilized in conjunction with signals 101 to increase overall corroborator 110 accuracy.

In a further embodiment, if there is a discrepancy found during the corroboration process, the default may be the HA data being flagged as more valid than the HY data.

For example, the HA module 120 (based on its own processing capability, information provided by a host system, subscription service, or the like) may be able to provide accuracy data including satellite identification, code/carrier values, Doppler rates, received signal quality, signal strength, track history and other tracking data, ionosphere information, and the like. The HY module 130 receiver (or location solution corroborator module 140) uses the information to generate a bias filter based on the information received. By utilizing the bias filter, HY module 130 may be able to generate a location solution 160 having a higher accuracy than a standalone HY module 130 could normally be able to attain.

In addition, the HA module 120 may provide integrity and/or validity data to disqualify signals 101 that HY module 130 would otherwise track. For example, the HA module 120 and/or the location solution corroborator module 140 may employ additional accuracy layers, or bias filters, such as over-determined PVT solutions, receiver autonomous integrity monitoring (RAIM), and/or fault detection and Exclusion (FDE). In addition, the HA module 120 may employ early-to-prompt acquisition and periodic re-search to identify multi-path and repeaters.

In addition to corroborating and delivering the corroborated data to the HA module 120 and the HY module 130, location solution corroborator module 140 may perform an analyses of the possible issues affecting HA module's 120 ability to acquire. This analysis may provide the HA module 120 with the correct places to look for the signal. For example, if HY module 130 has been previously used in a location and the HA module 120 is new to the area, the location solution corroborator module 140 would provide the HA module 120 with corroborated data that would amount to a hot load (e.g., up-to-date satellite locations and strengths) thereby enhancing the acquisition speed of the HA module 120.

In one embodiment, the corroboration of data at location solution corroborator module 140 may be at a variety of levels and occur for a variety of time durations. For example, the location solution corroborator module 140 may provide timing data, propagation data, or receiver autonomous integrity monitor (RAIM) data.

Referring now to 321, the HA location solution is again checked for success at generating a high accuracy location solution. In other words, in one embodiment the corroborated data including data from the HY module 130 may provide enough information to allow the HA module 120 to obtain a high accuracy location solution 160.

Moreover, if HA module 120 is not successful, the data from HA module 120 and HY module 130 is again corroborated at location solution corroborator module 140. In one embodiment, the 319-321 loop continues until HA module 120 is able to achieve a high accuracy location solution. In another embodiment, the corroboration/re-attempt loop is repeated as long as significant discrepancies are realized or until an acceptable accuracy threshold is met. In yet another embodiment, the corroboration/re-attempt loop is repeated a fixed number of times. In a further embodiment, the corroboration/re-attempt loop is repeated for a fixed period of time.

Moreover, as provided herein, in another embodiment the corroboration/re-attempt loop may be repeated intermittently.

With reference to 324, in one embodiment, user input is optionally provided. For example, user input may be a selected minimum accuracy range, an accuracy minimum allowable tolerance, or the like. In one embodiment, if the user input requests an accuracy minimum allowable tolerance that is greater than the present accuracy of NSS corroborator 110 location solution, no location solution 160 will be provided by position provider module 150. However, if the user input requests an accuracy minimum allowable tolerance that is less than the present accuracy of NSS corroborator 110 location solution, position provider module 150 will output location solution 160.

With reference now to 325 of FIG. 3 and to FIG. 1, in one embodiment, the corroboration data at location solution corroborator module 140 is utilized to provide a high yield location solution 160. Thus, while HA module 120 may not be able to generate a location solution 160, NSS corroborator 110 may be able to provide a high yield location solution 160 having a bias generated by information received from HA module 120 such that HY module 130 has a location solution that is more accurate that a standalone HY module 130 is inherently capable of providing.

As provided herein, in one embodiment the corroboration/re-attempt loop may be repeated intermittently throughout device operation thereby continuously monitoring and updating the accuracy and or bias filter settings of the HY module's location solution 160. In another embodiment, if only the HY module 130 is providing a location solution 160, the HA module 120 may cycle on and off at a rate which allows power saving capabilities for the NSS corroborator 110 while also allowing the HA module 120 to intermittently attempt to generate a high accuracy location solution 160. In addition, the NSS corroborator 110 including location solution corroborator module 140 may incorporate logic to periodically wake up the HA module 120 based on time, mode, or signal tracking history (e.g., significant change in received signal 101 strength, appearance of a satellite not previously tracked by the HA module 120 as listed in the "track list", or the like).

At 329, optional notification is provided. In one embodiment, the notification includes an accuracy warning. In another embodiment, the notification is an estimated accuracy range of the provided location solution 160. In yet another embodiment, the notification informs a user that the location solution 160 may not be within required/suggested/necessary accuracy parameters.

In addition, corroborated data, even when HA module 130 is unable to provide a high accuracy location solution, the information provided by the HA module 130 may significantly increase the accuracy of the high yield location solution generated by HY module 130. Thus, the NSS corroborator 110 provides combined performance, functionality, and integrity that may not be available in either stand-alone HY module 130 or HA module 120.

Figure 4:
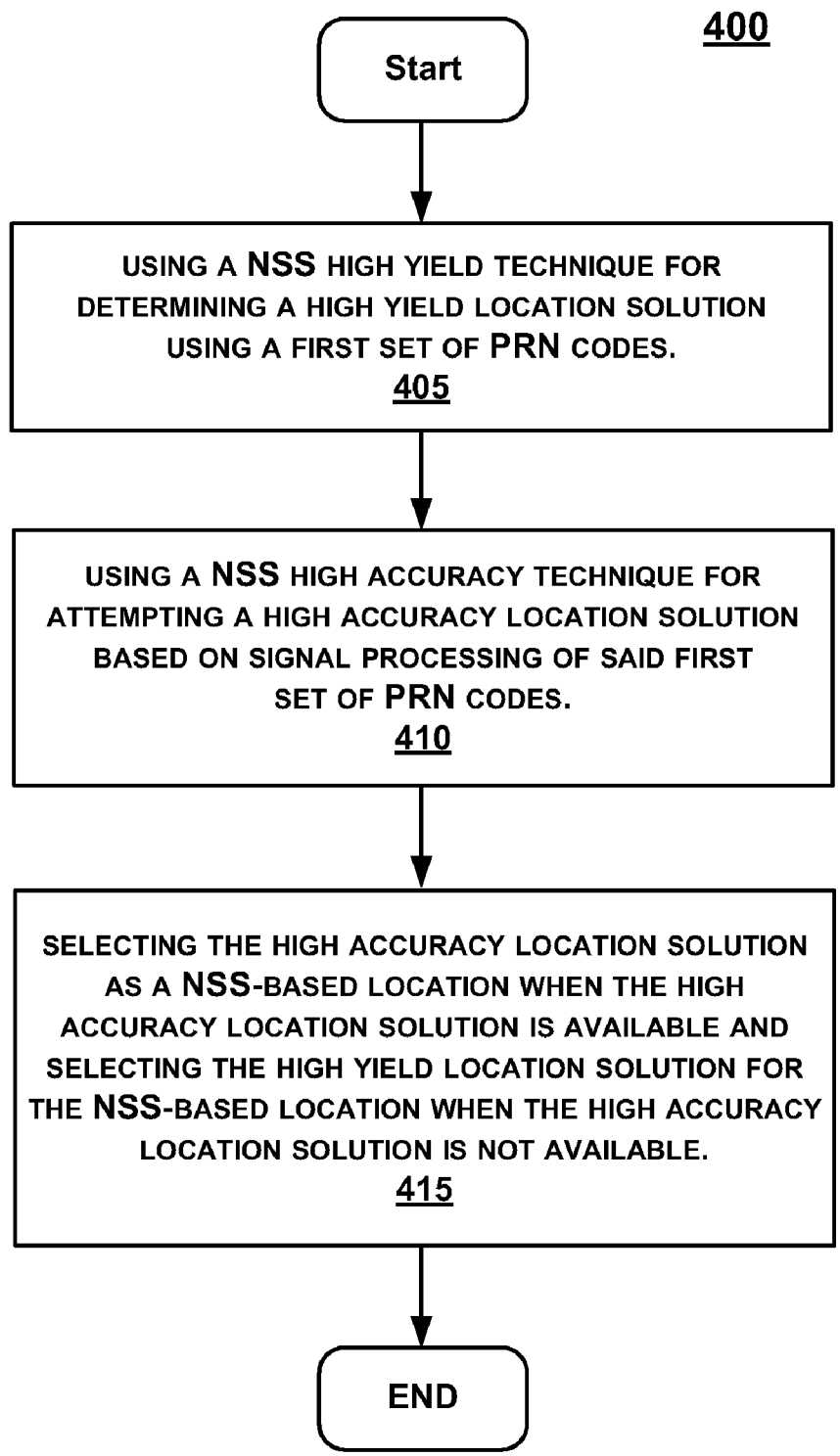
FIG. 4 is a flowchart of method for position determination based on code timings of an NSS PRN code in accordance with an embodiment of the present invention.

With reference now to FIG. 4, a flowchart 400 of a method for position determination based on corroborative navigation satellite system (NSS) position determination system is described.

At 405, a NSS high yield technique is used to determine a high yield location solution 160 using a first set of PRN codes. For example, one embodiment uses a NSS satellite signals having a lower signal-to-noise ratio may be used for determining the high yield location solution 160.

In one embodiment, the high yield technique additionally includes calculating a first dilution of precisions (DOP)s and a second DOPs for the first NSS satellite constellation and the second NSS satellite constellation, respectively. In addition, the high yield technique uses the first DOPs and the second DOPs to determine a first location accuracy and a second location accuracy, respectively.

In another embodiment, the high yield technique is used for determining a first high yield location solution and a second high yield location solution using a first NSS satellite constellation and a second NSS satellite constellation, respectively.

At 410, a NSS high accuracy technique is used for attempting a high accuracy location solution based on signal processing of the same first set of PRN codes. For example, one embodiment uses, a NSS satellite signal having a higher signal-to-noise ratio may be used for determining the high accuracy location solution.

In one embodiment, the high accuracy technique is used for determining a first high accuracy location solution and second high accuracy location solution using the first NSS satellite constellation and second NSS satellite constellation, respectively.

At 415, the high accuracy location solution is selected as a NSS-based location when the high accuracy location solution is available and selecting the high yield location solution for the NSS-based location when the high accuracy location solution is not available.

In a further embodiment, selecting the high accuracy location solution includes selecting the first high accuracy location solution when a first location difference between the first high accuracy and high yield location solution is smaller than a second location difference between the second high accuracy and high yield location solutions, and selecting the second high accuracy location solution when the second location difference is smaller than the first location difference for providing the NSS-based location.

As described herein, in one embodiment, when the high accuracy location solution is not available location solution corroborator module 140 corroborates data received from both the NSS high yield and high accuracy techniques in an attempt to determine a correction vector between the high accuracy location solution and the high yield location solution.

In general, the corroboration of data at the location solution corroborator module 140 will allow numerous data sharing options, calculations, and the like which may be beneficial for one or both the high yield and the high accuracy techniques. For example, a correction vector determined by the high accuracy technique may be received at location solution corroborator module 140 even when the complete high accuracy location solution is not available. Further, the location solution corroborator module 140 will provide the correction vector to the high yield location solution to help the high yield technique determine the NSS-based location. In so doing, the high yield location solution may be significantly more accurate.

In another example, location solution corroborator module 140 receives data from the high yield technique for determining signal acquisition data for acquiring a NSS signal for a particular NSS satellite. Accordingly, the location solution corroborator module 140 will provide the signal acquisition data information to the high accuracy technique in an attempt to assist the high accuracy technique in acquiring the NSS signal from the particular NSS satellite. In one embodiment, the signal acquisition data and the positioning data are selected from the group including, but not limited to, Doppler, code phase, clock drift, PRN number, and NSS clock.

In another accuracy building technique, the high accuracy technique may provide data to the location solution corroborator module 140 in regard to determining ionospheric parameters of an ionospheric model. Location solution corroborator module 140 will then incorporate the ionospheric parameters to determine a more accurate high yield location solution. In another embodiment, the determining of the ionospheric parameters of an ionospheric model may be performed by the location solution corroborator module 140.

Yet another technique may include having location solution corroborator module 140 receive a reference clock for processing NSS signals from NSS satellites in a high yield NSS receiver and provide the same reference clock for processing the NSS signals from the NSS satellites to a high accuracy NSS receiver. In one embodiment, the high accuracy NSS receiver is physically separate from the high yield NSS receiver. In another embodiment, the high accuracy NSS receiver is HA module 120 and the high yield NSS receiver is HY module 120 both of NSS corroborator 110.

Moreover, after receiving data from both the NSS high yield and high accuracy techniques, location solution corroborator module 140 may corroborate the data in an attempt to determine a location difference between the high accuracy location solution and the high yield location solution when the high accuracy location solution is available.

In one embodiment, a location error notification 329 may be provided when the location difference is greater than a selected threshold. In another embodiment, the location error notification 329 may be provided when a currently available number of pseudoranges for the high accuracy location solution are less than a selected availability number. For example, a user may select the availability number with user-accessible slider having integer settings such as 0-8.

In yet another embodiment, the location error notification 329 may be provided when an estimated location accuracy of the NSS-based location is less than a selected minimum accuracy. For example, the selected minimum accuracy may be a system default or may be user input such as with a user-accessible slider having accuracy settings.

Example Computing System

Figure 5:
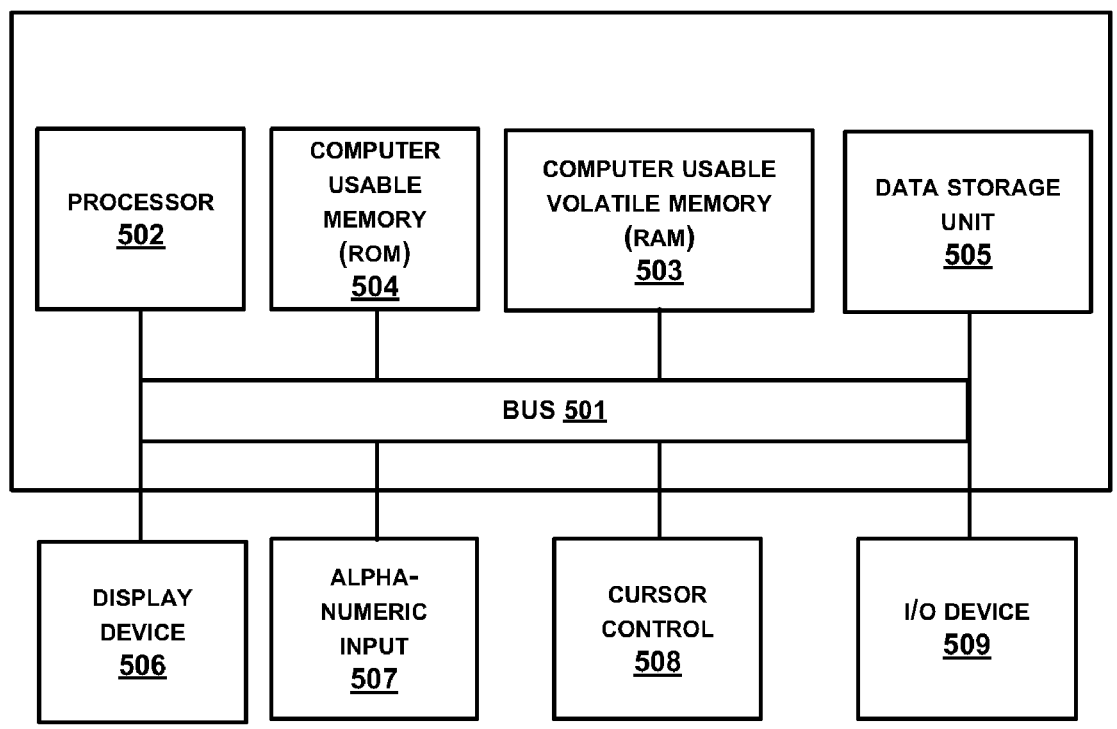
FIG. 5 is a block diagram of a computer system in accordance with an embodiment of the present invention.

Referring now to FIG. 5, a diagram of computer system 500 in accordance with one embodiment of the present invention is shown in greater detail. Within the discussions herein, it should be noted that certain processes and steps are discussed that are realized, in one embodiment, as a series of instructions (e.g., software program) that reside within computer readable memory units of system 500 and executed by processor 502 of system 500. When executed, the instructions cause the computer system 500 to perform specific functions and exhibit specific behavior as described.

In general, computer system 500 used by the embodiments of the present invention comprises an address/data bus 501 for communicating information, one or more central processors 502 coupled with the bus 501 for processing information and instructions, a computer readable volatile memory unit 503 (e.g., random access memory, static RAM, dynamic, RAM, etc.) coupled with the bus 501 for storing information and instructions for the central processor(s) 502, a computer readable non-volatile memory unit 504 (e.g., read only memory, programmable ROM, flash memory, EPROM, EEPROM, etc.) coupled with the bus 501 for storing static information and instructions for the processor(s) 502.

System 500 also includes a mass storage computer readable data storage device 509 such as a magnetic or optical disk and disk drive coupled with the bus 501 for storing information and instructions. Optionally, system 500 can include a display device 506 coupled to the bus 501 for displaying information to the computer user (e.g., maintenance technician, etc.), an alphanumeric input device 507 including alphanumeric and function keys coupled to the bus 501 for communicating information and command selections to the central processor(s) 502, a cursor control device 508 coupled to the bus for communicating user input information and command selections to the central processor(s) 502, and a signal generating input/output device 509 coupled to the bus 501 for communicating command selections to the processor(s) 502.

Example GNSS Receiver

Figure 6:
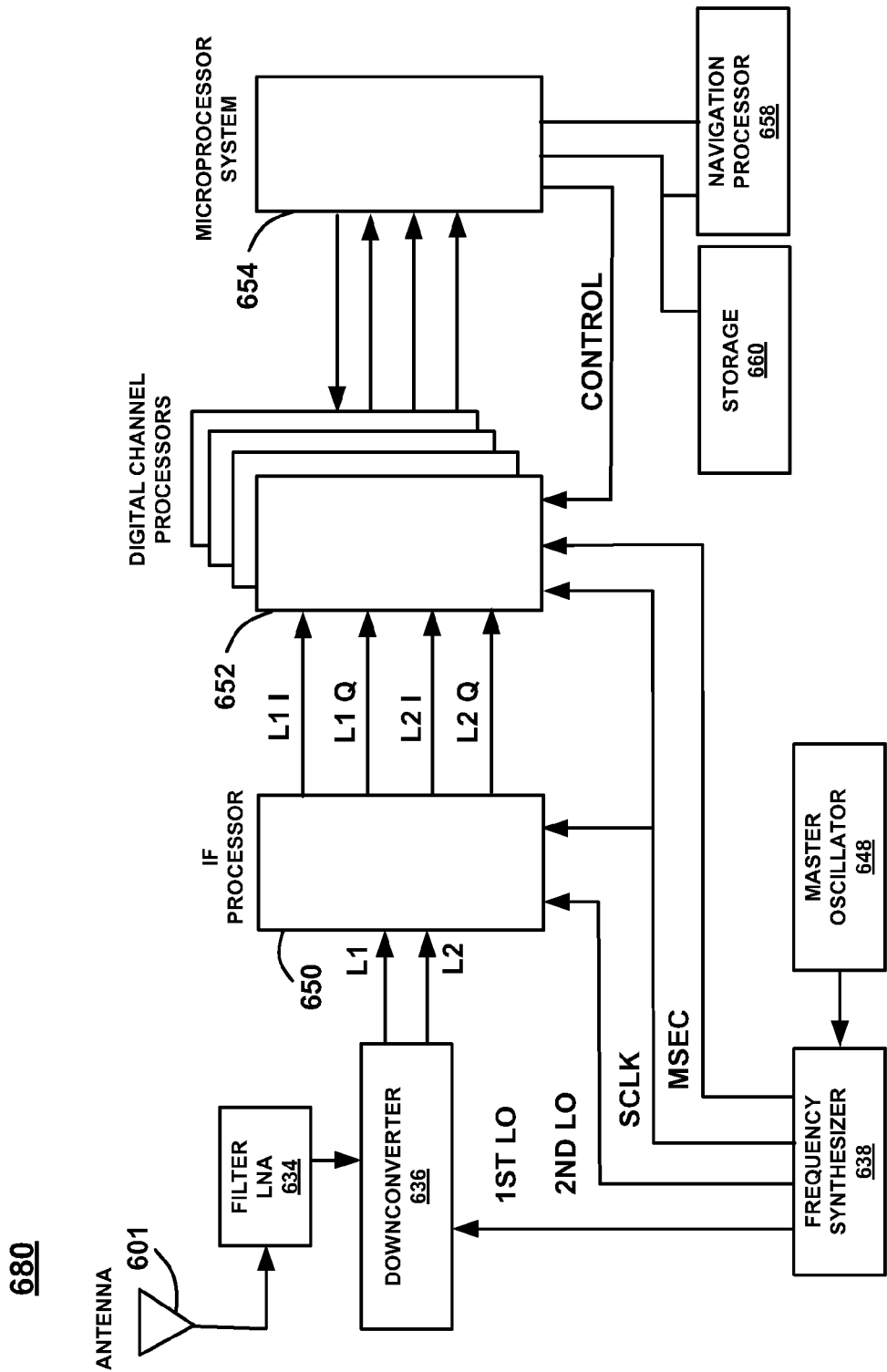
FIG. 6 is a block diagram of an example GNSS receiver which may be used in accordance with an embodiment of the present invention.

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s).

Embodiments of the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically are identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or nonvolatile storage such as a RAM or ROM, or some other computer readable memory device or media.

One example of a GPS chipset upon which embodiments of the present technology may be implemented is the Copernicus™ chipset which is commercially available from Trimble® Navigation of Sunnyvale, Calif., 94085. Other examples of a GPS chipsets upon which embodiments of the present technology may be implemented are the SiRFstar III™ GSC3e/LP and GSC3f/LP chipsets which are commercially available from SiRF® Technology Inc., of San Jose, Calif., 95112.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application. It is intended that the scope of the invention be defined by the Claims appended hereto and their equivalents.

What is claimed is:

1. A navigation satellite system (NSS) method for position determination based on signal processing of PRN codes, the method comprising:
   using a NSS high yield signal processing technique wherein a first high yield location solution is determined using a first set of PRN codes associated with a first NSS and a second high yield location solution is determined using a second set of PRN codes associated with a second NSS;
   using a NSS high accuracy technique for attempting a first high accuracy location solution based on signal processing of said first set of PRN codes and for attempting a second high accuracy location solution based on signal processing of said second set of PRN codes;
   selecting one of the first and second high accuracy location solutions as a NSS-based location when either or both of the first and second high accuracy location solutions is available, wherein when both the first and second high accuracy location solutions are available the first high accuracy location solution is selected when a first location difference between the first high accuracy and high yield location solutions is smaller than a second location difference between the second high accuracy and high yield location solutions, and the second high accuracy location solution is selected when the second location difference is smaller than the first location difference; and
   selecting one of the first and second high yield location solutions for the NSS-based location when no high accuracy location solution is available and one or both of the high yield solutions is available.

2. The method of claim 1, further comprising:
   selecting the PRN codes from the group of local and global NSS signals consisting of: a global positioning system (GPS) signal, a Galileo signal, a Globalnaya Navigatsionnay Sputnikovaya Sistema (GLONASS) signal, and a Compass signal.

3. The method of claim 1, further comprising:
   selecting the PRN codes from a group of satellite navigation signals consisting of: L1 signals, E1 signals, E2 signals, L2 signals, L3 signals, E6 signals, B3 signals, LEX signals, L5 signals, E5 signals, and AltBOC signals.

4. The method of claim 1, further comprising:
   determining a correction vector between the first high accuracy location solution and the first high yield location solution when the first high accuracy location solution is available; and
   applying the correction vector to the first high yield location solution for determining the NSS-based location when the first high accuracy location solution subsequently is not available.

5. The method of claim 1, further comprising:
   determining said first location difference between the first high accuracy location solution and the first high yield location solution when the first high accuracy location solution is available; and
   issuing a location error notification when the first location difference is greater than a selected threshold.

6. The method of claim 1, wherein using the high yield technique further comprises:
   calculating a first dilution of precision (DOP) and a second DOP for the first NSS and the second NSS, respectively; and
   using the first DOP and the second DOP for determining a first location accuracy and a second location accuracy, respectively.

7. The method of claim 1, further comprising:
   using the high yield technique for determining signal acquisition data for acquiring a NSS signal for a particular NSS satellite; and
   using the signal acquisition data for assisting the high accuracy technique for acquiring a NSS signal from the particular NSS satellite.

8. The method of claim 7, wherein the signal acquisition data is selected from the group consisting of: Doppler, code phase, NSS clock, clock drift, and PRN number.

9. The method of claim 1, further comprising:
   determining an estimated location accuracy of the NSS-based location based at least in part on a dilution of precision; and
   issuing a notification when the estimated location accuracy of the NSS-based location is less than a selected minimum accuracy.

10. The method of claim 9 further comprising:
selecting the selected minimum accuracy with user-accessible slider having accuracy settings.

11. The method of claim 1, further comprising:
issuing a notification when a currently available number of pseudoranges for either of the first and second high accuracy location solutions is less than a selected availability number; and
issuing a notification based on a dilution of precision (DOP) threshold.

12. The method of claim 11, further comprising:
selecting the availability number with user-accessible slider having integer settings.

13. The method of claim 12, wherein the availability number is selected from at least two of the numbers in the group consisting of: zero, one, two, three, four, five, six, seven and eight.

14. The method of claim 1, further comprising:
using the high accuracy technique for a determining ionospheric parameters of an ionospheric model; and
using the ionospheric parameters for determining the high yield location solutions.

15. The method of claim 1, further comprising:
using a reference clock signal for processing NSS signals from NSS satellites in a high yield NSS receiver; and
using the same reference clock signal for processing the NSS signals from the NSS satellites in a high accuracy NSS receiver, the high accuracy NSS receiver being physically separate from the high yield NSS receiver.

16. The method of claim 1, further comprising:
de-weighting pseudoranges corresponding to NSS satellites having elevation angles below an elevation threshold for determining the first high accuracy location solution.

17. The method of claim 1, further comprising:
using NSS satellite signals having a lower signal-to-noise ratio for determining the first high yield location solution.

18. A navigation satellite system (NSS) position determination system comprising:
a NSS high yield module for determining a first high yield location solution based on first positioning signals associated with a first NSS and for determining a second high yield location solution based on second positioning signals associated with a second NSS;
a NSS high accuracy module for determining a first high accuracy location solution based on the first positioning signals and for determining a second high accuracy location solution based on the second positioning signals; and
a location solution corroborator module for receiving input from both the NSS high yield module and the NSS high accuracy module, the location solution corroborator module for providing a corroborated location solution; and
a position provider outputting the corroborated location solution, wherein the corroborated location solution which is output comprises:
one of the first and second high accuracy location solutions as a NSS-based location when either or both of the first and second high accuracy location solutions is available, wherein when both the first and second high accuracy location solutions are available the first high accuracy location solution is output as the corroborated solution when a first location difference between the first high accuracy and high yield location solutions is smaller than a second location difference between the second high accuracy and high yield location solutions, and the second high accuracy location solution is output when the second location difference is smaller than the first location difference; and
one of the first and second high yield location solutions for the NSS-based location is output when no high accuracy location solution is available and one or both of the high yield solutions is available.

19. The system of claim 18 wherein one of said first NSS and said second NSS is a global navigation satellite system (GNSS) position determination system.

20. The system of claim 18 wherein one of said first NSS and said second NSS is a local navigation satellite system (LNSS) position determination system.

21. The system of claim 18 further comprising:
a correction vector module for receiving input from both the NSS high yield module and the NSS high accuracy module and determining a correction vector applicable to the first high yield location solution; and
a correction vector application module for applying the correction vector to the first high yield location solution.

22. The system of claim 18 further comprising:
a warning module for providing a notification when the accuracy of the corroborated location solution is below an accuracy threshold.

23. The system of claim 18 wherein the positioning signals are provided by the group of NSS providers consisting of: a global positioning system (GPS) signal, a Galileo signal, a Globalnaya Navigatsionnay Sputnikovaya Sistema (GLONASS) signal, and a Compass signal.

24. The system of claim 18 wherein the corroborated location solution has an accuracy greater than or equal to the least accurate of the first and second high yield location solutions and less than or equal to the least accurate of the first and second high accuracy location solutions.

* * * * *